Figure 1:
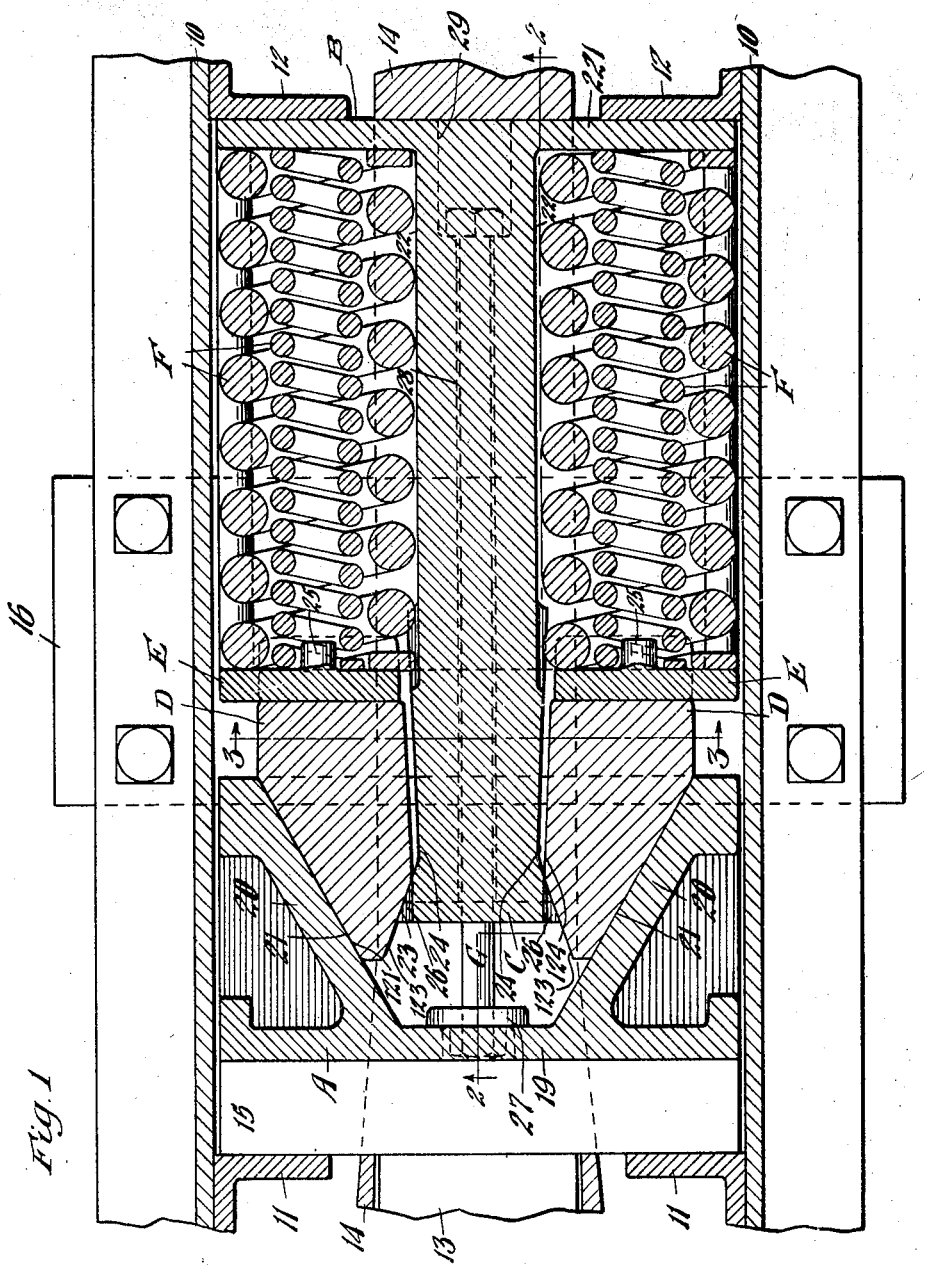

Nov. 8, 1927.

J. F. O'CONNOR 1,648,503

FRICTION SHOCK ABSORBING MECHANISM

Filed Jan. 28, 1925      2 Sheets-Sheet 1

Witnesses
Wm. Geiger

Inventor
John F. O'Connor
By George I. Haight
His Atty.

Nov. 8, 1927.    J. F. O'CONNOR    1,648,503
FRICTION SHOCK ABSORBING MECHANISM
Filed Jan. 28, 1925    2 Sheets-Sheet 2
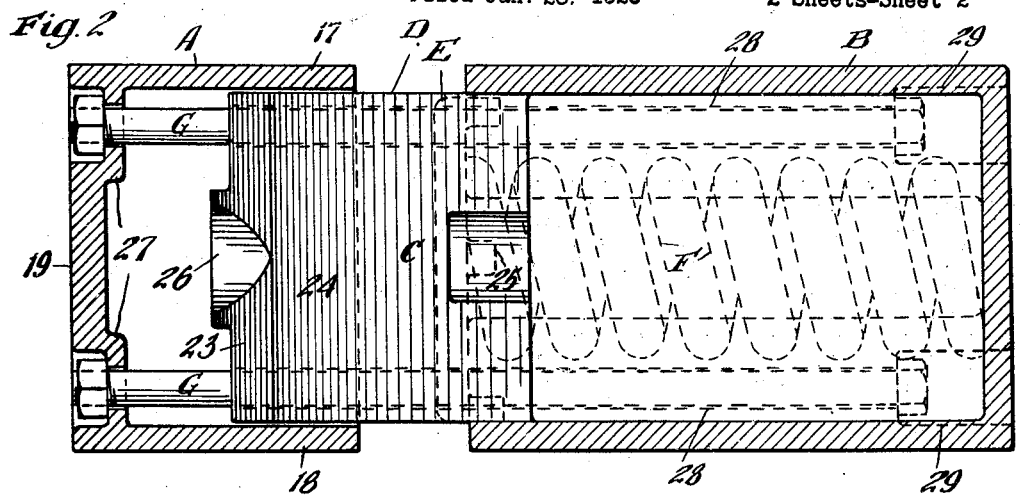
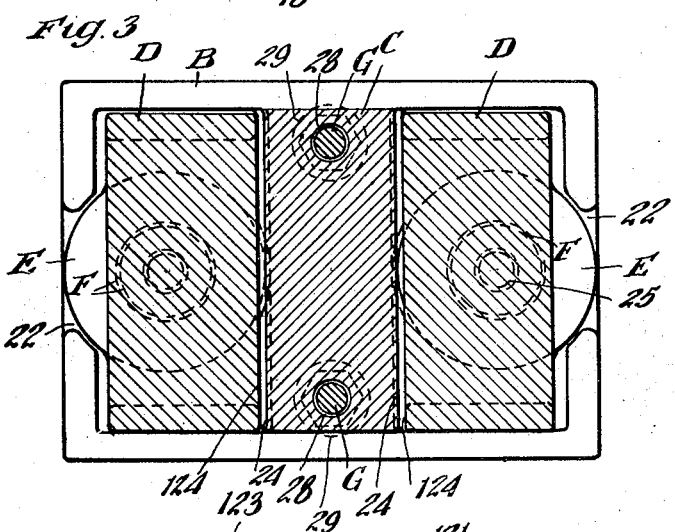
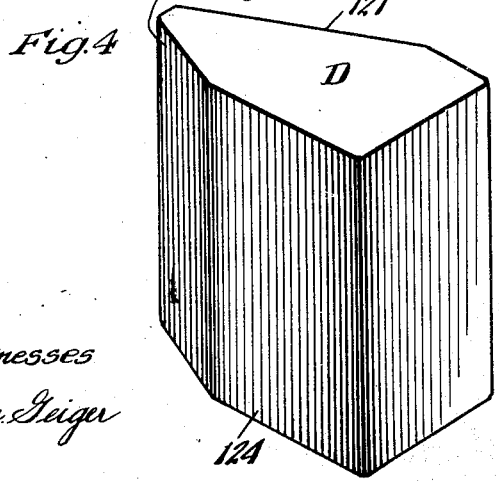
Witnesses
Wm. Geiger
Inventor
John F. O'Connor
By George D. Haight
His Atty.

Patented Nov. 8, 1927.

1,648,503

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed January 28, 1925. Serial No. 5,190.

This invention relates to improvements in friction shock absorbing mechanisms.

One object of the invention is to provide a high capacity friction shock absorbing mechanism, having relatively light initial action, followed by an increased, relatively high frictional resistance during the remainder of the compression stroke.

Another object of the invention is to provide a mechanism of the character indicated, especially adapted for railway draft riggings, including a plurality of relatively movable friction elements having co-operating friction surfaces, the surfaces of each element being arranged in series and operating in sequence, to successively provide an initial light action followed by a relatively heavier friction resistance during the remainder of the compression stroke.

A more specific object of the invention is to provide a friction shock absorbing mechanism, including a friction post and co-operating friction shoes, the post and shoes having a plurality of longitudinally disposed co-operating friction surfaces, certain of which converge and others of which diverge longitudinally of the mechanism, together with means for pressing the shoes against the post and forcing the same longitudinally thereof.

Other objects and advantages of the invention will more fully and clearly appear from the description and claims hereinafter following.

In the drawings, forming a part of this specification, Figure 1 is a longitudinal, horizontal, sectional view of a portion of the railway draft rigging showing my improvements in connection therewith. Figure 2 is a vertical, longitudinal, sectional view corresponding substantially to the line 2—2 of Figure 1. Figure 3 is a vertical, transverse, sectional view corresponding substantially to the line 3—3 of Figure 1. And Figure 4 is a detailed, perspective view of one of the friction wedge shoes used in connection with my improved mechanism.

In the drawings, 10—10 indicate channel-shaped center or draft sills of a railway car underframe, to the inner surfaces of which are secured front stop lugs 11—11 and rear stop lugs 12—12. The inner end portion of the draw bar is indicated at 13, to which is operatively connected a hooded yoke 14 of usual construction. The shock absorbing mechanism proper, as well as the front main follower 15, is operatively disposed within the yoke. The yoke and parts therewithin are supported in operative position by a detachable saddle plate 16, fixed to the draft sills.

The improved shock absorbing mechanism proper, as shown, comprises, broadly, a front wedge casing A; a combined rear follower and spring cage B having a friction post C formed integral therewith; a pair of wedge-shoes D—D; a pair of spring followers E—E; twin arranged spring resistance elements F—F; and a pair of retainer bolts G—G.

The casing A is in the form of a hollow rectangular box-like casting having a top wall 17, a bottom wall 18, a transverse front end wall 19 and rearwardly diverging side walls 20—20. The front wall 19 of the casing A bears directly on the inner surface of the main follower 15. The rearwardly diverging side walls present rearwardly diverging opposed interior wedge faces 21—21. The side walls are preferably reinforced by horizontally disposed webs, as clearly shown in Figure 1.

The combined rear follower B and spring cage is in the form of a rectangular casing having a transverse end wall 221 adapted to co-operate with the rear stop lugs 12 in the manner of the usual rear follower. The friction post C extends forwardly from the transverse wall 221 and is formed integral with the top and bottom walls of the casing, the side walls of the casing being recessed as indicated at 22 to accommodate the corresponding sides of the spring resistance elements F. As clearly shown in Figures 1 and 2, the friction post C projects beyond the front end of the casing B. At the forward end, the friction post C is provided with two sets of friction surfaces, the sets being disposed on opposite sides of the post. Each set comprises outer and inner surfaces 23 and 24 inclined with reference to the longitudinal axis of the mechanism, the surface 24 being inclined to a greater degree than the surface 24, and being reversely arranged thereto. In other words, the friction surfaces 23 on the opposite sides of the post converge while the friction surfaces 24 at the opposite sides of the post diverge inwardly of the mechanism. As clearly shown in Figures 1 and 2, the front end of the post is normally spaced a distance from the inner surface of the wall 19 of the casing A equal to the compression stroke of the mechanism. The front end of the spring cage is spaced a similar distance from the inner end of the casing A.

The friction wedge-shoes D, which are preferably in the form of castings, are of like construction, each having an outer wedge face 121 adapted to co-operate with the corresponding wedge face 21 of the casing A. On the inner side, each shoe is provided with two friction surfaces 123 and 124, correspondingly inclined to and adapted to co-operate with the friction surfaces 23 and 24 of the friction post. The inner ends of the friction shoes bear directly on the spring followers E, which are interposed between the same and the main spring resistance elements.

The twin arranged main spring resistance elements F are arranged within the spring cage, being disposed on opposite sides of the friction post. Each member of the twin arranged spring resistance element F comprises an inner relatively light coil, and an outer heavier coil, the front and rear ends of each coil bearing respectively on the spring follower and the rear wall 21 of the spring cage, and the inner coil being held in centered position by a rearwardly projecting lug 25, on the corresponding spring follower. As clearly shown in Figure 1, the opposite sides of the outer end portion of the friction post B are recessed as indicated at 26, to permit insertion of the twin spring elements through the front end of the spring cage.

The retainer bolts G are two in number and are arranged centrally of the mechanism, being disposed at the top and bottom thereof, each bolt having its rear end anchored to the post C and its front end anchored to the casing A, the casing being recessed to accommodate the bolt head and having a reinforcement 27 on the inner side of the wall 19 thereof. The shanks of the bolts extend through longitudinal bores 28 at the top and bottom of the post. The head of each bolt is adapted to work in an elongated recess 29 at the rear end of the post.

The retainer bolts serve to maintain the mechanism of over-all uniform length and hold the main spring resistance elements under initial compression.

The normal position of the parts is that shown in Figure 1, with the friction surfaces 123 of the shoes engaging the friction surfaces 23 of the post, and the surfaces 24 and 124 of the post and shoes slightly spaced to provide for preliminary action of the mechanism.

The operation of the improved shock absorbing mechanism, assuming a compression stroke, is as follows. As the follower 15 is forced inwardly, the casing A will be carried rearwardly therewith, wedging the friction shoes D against the surfaces 23 of the post and carrying the shoes rearwardly on the latter. This action will continue until the friction surfaces 24 and 124 of the post and shoes come into engagement, thereby transferring the frictional resistance from the surfaces 23 and 123 to the surfaces 24 and 124. During the remainder of the compression stroke, the shoes D will be forced to slide on the surfaces 24 of the post. During the last named action, there will be a separation of the shoes laterally of the mechanism, due to the diverging relation of the surfaces 24, causing the shoes to slip on the wedge faces 21 of the casing A, in addition to the movement of the shoes on the friction surfaces 24 of the post. This action will cause a more rapid inward movement of the shoes than the movement of the casing A and effect an additional compression of the main spring resistance elements. It will be evident that due to the rearwardly converging relation of the co-acting surfaces 23 and 123 of the post and shoes, a relatively light initial action will be had, followed by a greatly augmented frictional resistance when the surfaces 24 and 124 of the post and shoes become operative. The described action will continue either until the actuating force is reduced or the inward movement of the casing A is limited by engagement of the end wall 19 thereof with the outer end of the friction post, and engagement of the inner end of the casing with the front end of the spring cage, whereupon the actuating force will be transmitted directly through the spring cage and post to the stop lugs, preventing the main springs from being driven solid. Upon reduction of the actuating force, the main spring resistance elements E will effect restoration of all of the parts to normal position, the outward movement of the casing A being positively limited by the retainer bolts G.

From the preceding description taken in connection with the drawings, it will be evident that I have provided a very simple and efficient shock absorbing mechanism having relatively light resistance during initial action, followed by a heavier fractional resistance during the remainder of the compression stroke. The relatively light preliminary action followed by the heavier resistance adapts this gear particularly for use in connection with passenger cars.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction element having a plurality of sets of longitudinally arranged friction surfaces, the surfaces of each set being angularly disposed with reference to each other and extending in opposite directions longitudinally of the mechanism; a plurality of friction-shoes, each shoe having a plurality of friction surfaces co-operating with one of said sets of first named surfaces; pressure-transmitting means having wedge faces engaging said shoes for forcing the same against said friction elements and longitudinally thereof, all of said wedge faces of said means being relatively fixed; and means yieldingly resisting movement of said shoes.

2. In a friction shock absorbing mechanism, the combination with a friction element having two sets of opposed longitudinally arranged relatively fixed friction surfaces, the surfaces of each set being angularly disposed with reference to each other, and all of said surfaces being inclined with reference to the longitudinal axis of the mechanism; of a pair of wedge-shoes, each shoe having a plurality of friction surfaces co-operating with one of the sets of friction surfaces of said element and similarly disposed thereto: wedge-pressure-transmitting means engaging the shoes; and means yieldingly opposing inward movement of the shoes.

3. In a friction shock absorbing mechanism, the combination with a plurality of co-operating, relatively movable friction elements, said elements having inter-engaging sets of friction surfaces, said sets being independently and successively operative, all of said surfaces being inclined to the longitudinal axis of the mechanism; of wedge-pressure-transmitting means co-operating with certain of said elements for moving the friction elements relatively to each other longitudinally of the mechanism and forcing the same into intimate contact; and a main spring resistance.

4. In a friction shock absorbing mechanism, the combination with a friction element having two sets of longitudinally extending surfaces, the surfaces of each set being inclined in opposite directions with reference to the axis of the mechanism; of a plurality of wedge-friction-shoes co-operating with the friction surfaces of said element, each shoe having a set of surfaces correspondingly inclined to and adapted to co-operate with one of the sets of surfaces of the friction element; wedge-pressure-transmitting means for forcing the shoes laterally against the surfaces of said friction element and longitudinally of the mechanism; and means yieldingly resisting movement of said shoes.

5. In a friction shock absorbing mechanism, the combination with a plurality of relatively movable adjacent friction elements each having a set of friction surfaces, said sets of friction surfaces co-operating with each other the surfaces of each set being angularly disposed with reference to each other, all of said surfaces being inclined to the longitudinal axis of the mechanism and correspondingly disposed to the co-operating set of surfaces of the adjacent friction element and one of the surfaces of each set engaging the corresponding surface of the other set initially and in advance of engagement of the remaining surfaces of said sets, certain of said elements having wedge faces; of wedge means for forcing said elements into tight frictional contact, said wedge means having wedge faces angularly disposed to the longitudinal axis of the mechanism and co-operating with said last named elements, each of the wedge faces of said wedge means being inclined to the longitudinal axis of the mechanism in reverse direction to the inclination of the initially acting friction surfaces of the respective friction elements co-operating with said wedge faces; and spring means resisting relative movement of said element.

6. In a friction shock absorbing mechanism, the combination with a longitudinally disposed friction element having a plurality of friction surfaces thereon arranged in sets, said sets of friction surfaces being disposed at opposite sides of the longitudinal axis of the mechanism, certain opposed surfaces of said sets converging and the remaining opposed surfaces of said sets diverging inwardly of the mechanism; of a friction-wedge-shoe co-operating with each set of friction surfaces and having a plurality of friction surfaces similarly disposed to the friction surfaces of the corresponding set of said element; wedge-pressure-transmitting means co-operating with the shoes; and a main spring resistance.

7. In a friction shock absorbing mechanism, the combination with relatively movable friction elements, each of said elements having a plurality of friction surfaces, corresponding surfaces of said elements being adapted to co-operate, said surfaces being arranged in series to operate in sequence, to provide successively initial light resistance and final relatively heavier frictional resistance during the remainder of the compression stroke; of pressure transmitting means movable inwardly of the mechanism having wedge faces for pressing said friction elements into intimate frictional contact and moving the same relatively to each other longitudinally of the mechanism, said wedge faces being relatively fixed with reference to each other; and means, yieldingly resisting movement of said elements.

8. In a friction shock absorbing mechanism, the combination with a friction element having two sets of friction surfaces, said sets being disposed on opposite sides of the longitudinal axis of the mechanism, each set comprising an outer friction surface disposed at an angle to the longitudinal axis of the mechanism and an inner surface inclined with reference to said axis; of a pair of friction-wedge-shoes disposed on opposite sides of the mechanism, each shoe having a set of friction surfaces, the surfaces of said set being disposed at an angle to each other, and adapted to co-operate with one of said sets of first named friction surfaces; pressure transmitting means having wedge faces co-operating with said shoes the wedge faces of said pressure transmitting means being inclined to the longitudinal axis of the mechanism in a direction reverse to the inclination of said outer friction surfaces; and a main spring resistance.

9. In a friction shock absorbing mechanism, a central friction element having a plurality of sets of friction surfaces thereon; of a plurality of friction shoes movable relatively thereto, each shoe having a set of surfaces co-operating with one of the sets of surfaces of the central element, certain of said co-operating surfaces of said last named sets being inclined in one direction with reference to the axis of the mechanism, and the remaining co-operating surfaces thereof being inclined to said axis in a reverse direction; of wedge-pressure-transmitting means co-operating with said shoes; and a main spring resistance.

10. In a friction shock absorbing mechanism, the combination with a friction post, said post having inwardly converging friction surfaces on the opposite sides thereof, said post also having friction surfaces on the opposite sides thereof diverging inwardly of the mechanism; of friction-shoes co-operating with said post, each shoe having friction surfaces correspondingly disposed to and co-operating with the friction surfaces on one side of the post; wedge means co-operating with the shoes; and a main spring resistance.

11. In a friction shock absorbing mechanism, the combination with front and rear follower-acting members, one of said members having a friction post extending therefrom and the other member having interior wedge faces; of friction-shoes co-operating with said post, each shoe having a wedge face co-operating with one of the first-named wedge faces, said post and each shoe having co-operating friction surfaces inclined with reference to the axis of the mechanism, and said post and each shoe having additional co-operating friction surfaces angularly disposed with reference to said inclined friction surfaces and the axis of the mechanism; and means yieldingly resisting movement of said shoes.

In witness that I claim the foregoing I have hereunto subscribed my name this 24th day of January, 1925.

JOHN F. O'CONNOR.